United States Patent
Straetmans et al.

(10) Patent No.: US 9,488,411 B2
(45) Date of Patent: Nov. 8, 2016

(54) METHOD AND DEVICE FOR DRYING SHEETS OF DRYWALL

(75) Inventors: Christoph Straetmans, Bad Hersfeld (DE); Karl Friedrich Lang, Bad Hersfeld (DE)

(73) Assignee: GRENZEBACH BSH GMBH, Bad Hersfeld (DE)

( * ) Notice: Subject to any disclaimer, the term of this patent is extended or adjusted under 35 U.S.C. 154(b) by 829 days.

(21) Appl. No.: 13/514,072

(22) PCT Filed: Dec. 15, 2010

(86) PCT No.: PCT/DE2010/001477
§ 371 (c)(1),
(2), (4) Date: Jun. 6, 2012

(87) PCT Pub. No.: WO2011/076180
PCT Pub. Date: Jun. 30, 2011

(65) Prior Publication Data
US 2012/0246966 A1 Oct. 4, 2012

(30) Foreign Application Priority Data
Dec. 21, 2009 (DE) ........................ 10 2009 059 822

(51) Int. Cl.
*F26B 21/04* (2006.01)
*F26B 21/02* (2006.01)
(Continued)

(52) U.S. Cl.
CPC ............... *F26B 21/04* (2013.01); *F26B 13/10* (2013.01); *F26B 15/12* (2013.01); *F26B 15/18* (2013.01); *F26B 21/02* (2013.01)

(58) Field of Classification Search
CPC ...... F26B 13/10; F26B 13/108; F26B 15/12; F26B 15/18; F26B 21/04; F26B 21/02; F26B 21/022; F26B 21/028; F26B 21/12; F26B 23/001; F26B 23/002; F26B 23/007; F26B 23/10; F26B 2210/14; F26B 2210/16
USPC ........................................ 34/451, 86
See application file for complete search history.

(56) References Cited

U.S. PATENT DOCUMENTS 3,529,357 A    9/1970  Schuette et al.
3,849,904 A *  11/1974 Villalobos ...................... 34/636
(Continued)

FOREIGN PATENT DOCUMENTS

DE         509362       9/1930
DE         4326877 C1   10/1994
(Continued)

OTHER PUBLICATIONS

DE 509362: partial English Machine Translation (description). Accessed Feb. 2015.*
(Continued)

*Primary Examiner* — Kenneth Rinehart
*Assistant Examiner* — Tavia Sullens
(74) *Attorney, Agent, or Firm* — Duane Morris LLP; Gregory M. Lefkowitz

(57) ABSTRACT

A method and device for drying sheets is described. The sheets are guided through a drier divided into drying chambers and brought in contact with the drying air by means of impinging jet aeration. The impinging-jet aeration utilizes cross-aerated nozzle boxes and the main drying stage exhaust air is introduced in the pressure chamber of one or more drying chambers in the first half of the final drying stage. Pan of the exhaust air in the recirculated-air operation is used for drying in the drying chamber and part of the exhaust air is introduced into the suction chamber of the respective subsequent drying chamber. The exhaust air collectively passes through the final drying stage in this manner, and the exhaust air from one or more drying chambers in the second half of said stage is extracted at a significantly lower temperature.

7 Claims, 7 Drawing Sheets

(51) Int. Cl.
*F26B 15/12* (2006.01)
*F26B 15/18* (2006.01)
*F26B 13/10* (2006.01)

(56) References Cited

U.S. PATENT DOCUMENTS

| | | | |
|---|---|---|---|
| 4,133,636 A * | 1/1979 | Flynn | D06C 7/00 34/513 |
| 4,312,136 A | 1/1982 | Bahner et al. | |
| 4,490,924 A | 1/1985 | Lambert | |
| 4,831,747 A * | 5/1989 | Roos et al. | 34/565 |
| 5,005,250 A | 4/1991 | Trautmann et al. | |
| 5,062,218 A * | 11/1991 | Weil | 34/629 |
| 5,528,839 A | 6/1996 | Seidl | |
| 5,603,168 A | 2/1997 | McMahon | |
| 5,657,555 A | 8/1997 | Milojevic et al. | |
| 5,659,975 A | 8/1997 | Bahner et al. | |
| 5,771,602 A | 6/1998 | Heikkila et al. | |
| 6,018,886 A * | 2/2000 | Bell et al. | 34/655 |
| 6,742,285 B2 | 6/2004 | Shepard | |
| 2012/0246966 A1 | 10/2012 | Straetmans et al. | |

FOREIGN PATENT DOCUMENTS

| | | |
|---|---|---|
| DE | 202009017286 U1 | 6/2010 |
| JP | S31-009740 | 11/1931 |
| JP | S56-161493 | 12/1981 |
| JP | H09-152274 | 6/1997 |

OTHER PUBLICATIONS

DE 509362: partial English Machine Translation (claims). Accessed Feb. 2015.*
Patent Cooperation Treaty; "International Search Report" by ISA/European Patent Office, Authorized Officer Gunther Hauck issued Apr. 27, 2011; pp. 1-3.

* cited by examiner

METHOD AND DEVICE FOR DRYING SHEETS OF DRYWALL

CROSS-REFERENCE TO RELATED APPLICATIONS

This application is a §371 national stage entry of International Application No. PCT/DE2010/001477, filed Dec. 15, 2010, which claims priority to German Patent Application No. DE 10 2009 059 822.7 filed Dec. 21, 2009, the entire contents of which are incorporated herein by reference.

FIELD OF THE INVENTION

The invention refers to a method and to a device for drying sheet-like materials, especially sandwich-type drywall sheets.

BACKGROUND OF THE INVENTION

The drying of such sheet-like materials is carried out in most cases by means of a predominantly convective heat transfer in the form of cross-flowing of heated air. The sheets in this case, often also distributed over a plurality of tiers, are guided through the drier by means of feed or transporting devices such as roller conveyors or screen belts.

According to the prior art, drying plants are operated in most cases in circulating air mode. The drying air in this case is repeatedly directed onto the sheets and reheated after each contact. The air is increasingly enriched with moisture in this way, only a small portion of the drying air being discharged to the environment as exhaust air in order to discharge moisture and flue gases to the environment.

A characteristic feature of different types of construction of drier forms the type of air guiding over the material to be dried. The air can basically be guided onto the sheet in the form of cross aeration, longitudinal aeration, or so-called impingement jet aeration.

In the case of cross aeration, the drying air is guided over the material to be dried from the side, transversely to the feed direction of the sheet-like material. Since the drying air is increasingly cooled during its path over the material to be dried, different drying speeds are consequently created across the width. Therefore, this method is not used in the case of sensitive materials such as sandwich-type drywall sheets.

In the case of longitudinal aeration, the drying air travels over a long path along the longitudinal axis of the drier, flows over the sheet in the process, dries this and cools down to a considerable extent as a result. The drying air, therefore, at low temperatures, can be discharged in an energetically especially favorable manner close to the dew point of the drying air. For heating fresh air by means of a heat exchanger, condensation heat can then be purposefully utilized.

In the case of impingement jet aeration, the drying air is fed from the side of the drying plant in air lines, in so-called nozzle boxes, and, via air-exit nozzles, is blown perpendicularly onto the surface of the material to be dried. From there, this air flows to the opposite side of the drying plant.

Driers operating in accordance with a similar construction are distributed on a worldwide basis in the meantime. Counted among their advantages is the fact that as a result of the construction consisting of a multiplicity of relatively short drying chambers, which in each case can be individually aerated and heated, the desired drying temperature and the climate over the length of the drier can be freely selected. Therefore, the drying conditions can be adapted to the requirements of the material to be dried. The drier, moreover, can be controlled in an excellent manner, e.g. during product changes.

As a result of the good heat transfer during the impingement jet inflow, such driers can be of a considerably shorter construction than comparable driers which are exposed to flow with longitudinal aeration.

By adjusting the nozzle box inclination, moreover, an extremely uniform drying across the width of the material to be dried can be achieved.

The exhaust air of each chamber is individually discharged and collected. Since chambers with process-induced high drying temperatures are also ranked among these, an altogether high exhaust air temperature results. Also, by using a heat exchanger, the condensation heat contained within the exhaust air humidity can hardly be meaningfully utilized.

Such a plant is described in DE 19 46 696 A1 under the title of a method and a device for accelerated drying of drywall sheets. The printed publication deals with the description of the drying chamber which is designed so that a heat yield which is as high as possible and drying which is as uniform as possible across the width of the material to be dried is ensured. Measures for reducing the energy consumption are not mentioned, however.

A two-stage drying method and a drying plant is known from DE 26 13 512 A1, upon which is based the object of modifying or supplementing the as known per se two-stage drying method so that especially drywall sheets or materials with similar properties can be economically dried according to this method.

In the case of the two-stage drying method, the second drying stage, by interposing a heat exchanger, is heated from the exhaust air of the first drying stage. The sheets are to be dried in the first drying stage at high temperature and with high air humidity, and in the second drying stage are to be dried at relatively low temperature and with low air humidity. The first stage in this case is longitudinally aerated, and the second stage is cross aerated. Impingement jet aeration is not used. A very low consumption can certainly be realized with this type of construction. On account of the indirect heating of the second stage, the temperature level is very low, however. A low drying capacity and a high consumption of feed power result accordingly. The drier has not, therefore, been able to be put through in practice.

Furthermore, a method for drying sheets and a corresponding drier is known from DE 43 26 877 C1.

Based on the method according to DE 26 13 512, a method with the lowest possible primary and secondary energy consumption is described. In particular, the primary energy used is to be minimized as far as possible by utilizing the waste heat and also the condensation heat of the exhaust air without increasing the need for secondary energy by circulating large air mass flows. This object is achieved in this case by the exhaust air of stage A being directed in stage B through a heat exchanger, which is arranged in the tiers of the drier, and by the drying air, at low temperature and with low air humidity, being guided in counterflow to the exhaust air of stage A.

Stage B, which is responsible for the cooling of the exhaust air, in this case, however, has no impingement jet aeration and as a result of the indirect heating the drying capacity of stage B is quite low.

SUMMARY OF THE INVENTION

The device according to the invention, or the method according to the invention, is therefore based on the object of carefully drying sheet-like materials, with the lowest possible expenditure of energy, by means of impingement jet aeration. The aim is to be able to modify existing plants as inexpensive as possible within the meaning of the invention.

This object is achieved with a method according to claim 1, or a device according to claim 9.

The device according to the invention is described in more detail in the following text. In the drawing, in this case in detail:

DETAILED DESCRIPTION OF THE INVENTION

Figure 1:
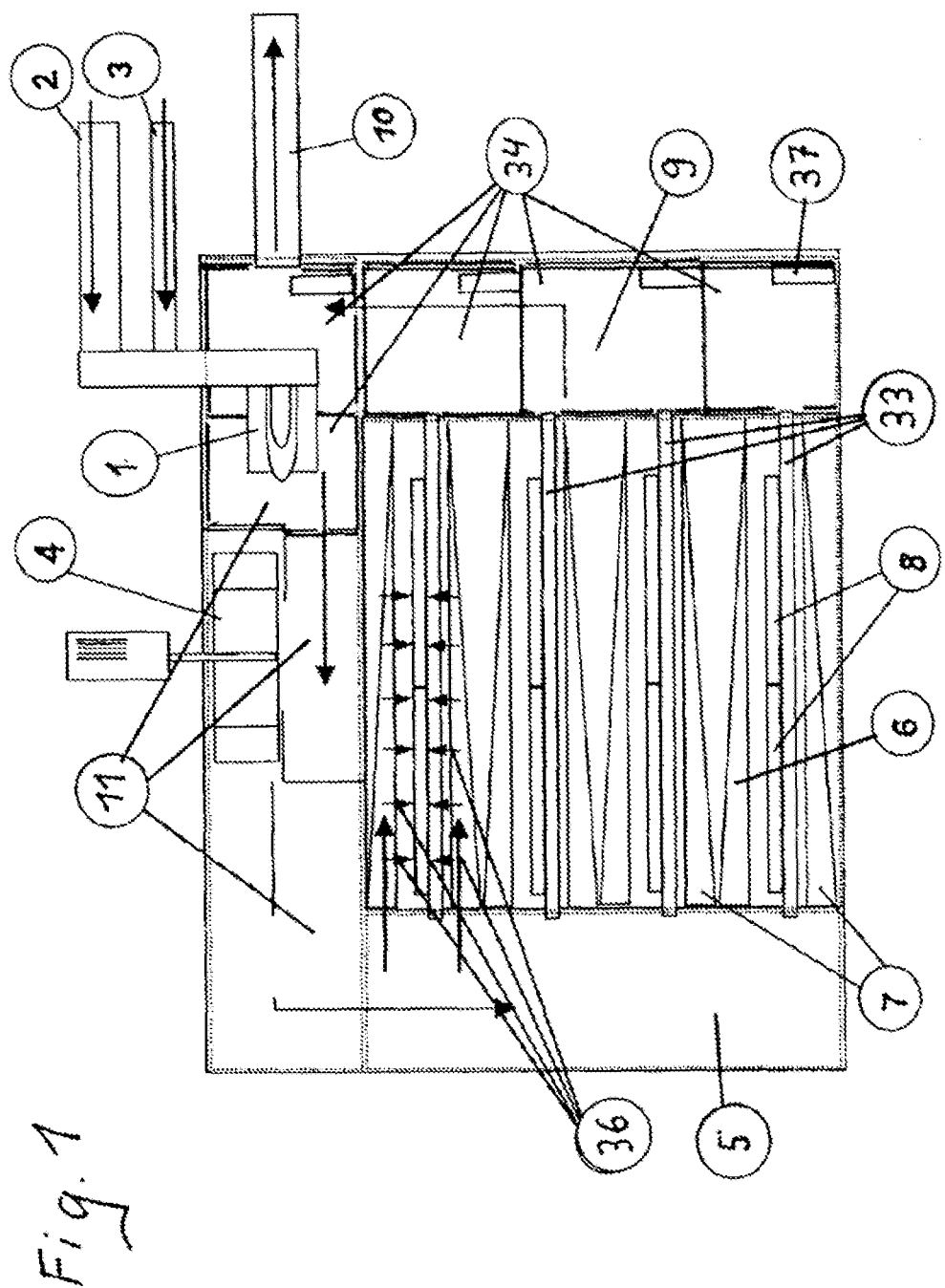
FIG. 1: shows a section through a drying chamber according to the invention

FIG. 1 shows a section through a drying chamber according to the invention. The arrows indicate the flow direction of the drying air.

Preheated fresh air is fed to the burner 1 as combustion air 2 and mixing air 3. Gas and oil are used as fuels. At this point, steam-heated or thermooil-heated heating registers are also used instead of the burners. The air is then heated indirectly.

The transfer of the air, which is heated by means of the burner 1, into the pressure chamber 5 is carried out via the circulating air fan 4. The pressure chamber 5 serves for the uniform distribution of air into the individual tiers of the drying chamber 6. The air in this case is first of all forced into so-called nozzle boxes 7 from which it is blown vertically onto the sheets 8 via orifice nozzles 36, which for the sake of clarity are shown only in the upper drying plane of the drying chamber 6, which orifice nozzles are arranged on the upper side or lower side of the nozzle box. The sheets 8 are fed perpendicularly to the viewing plane by a transporting device 33.

In order to ensure a uniform distribution of air across the width, the nozzle boxes are of a tapered construction. The air then flows into the suction chamber 9 above and below the sheets 8. A portion of the air, which in sum basically equates to the combustion gases, the fresh air, and also the water vapor which is produced as a result of the drying, escapes via the exhaust air exit 10. The circulating air circuit is completed at the burner 1. The region above the pressure chamber 5 and suction chamber 9, and also above the drying chamber 6, is also referred to as an overhead 11. In the case of normal drying chambers, adjacent drying chambers in the pressure chamber and suction chamber, and also in the overhead 11, are delimited by means of closed boundary walls. In FIG. 1, it is to be seen that the drying chamber 43 according to the invention is separated from the next chamber via a wall flap, or via a plurality of wall flaps 34, in the suction chamber 9. Five flaps are shown here by way of example. A wall-flap control unit 37 is associated with these wall flaps 34 in each case in order to purposefully control the air feed into the next chamber or into the next section of the drier. Since an air flow moving basically in a circulating manner is created as a result of the circulating air fan 4 in each drying chamber and a portion of the air flow finds its way via the wall flaps 34 into the next drying chamber which follows a specific drying chamber, an air flow in the longitudinal direction of the final drying section 21 is additionally created.

Figure 2:
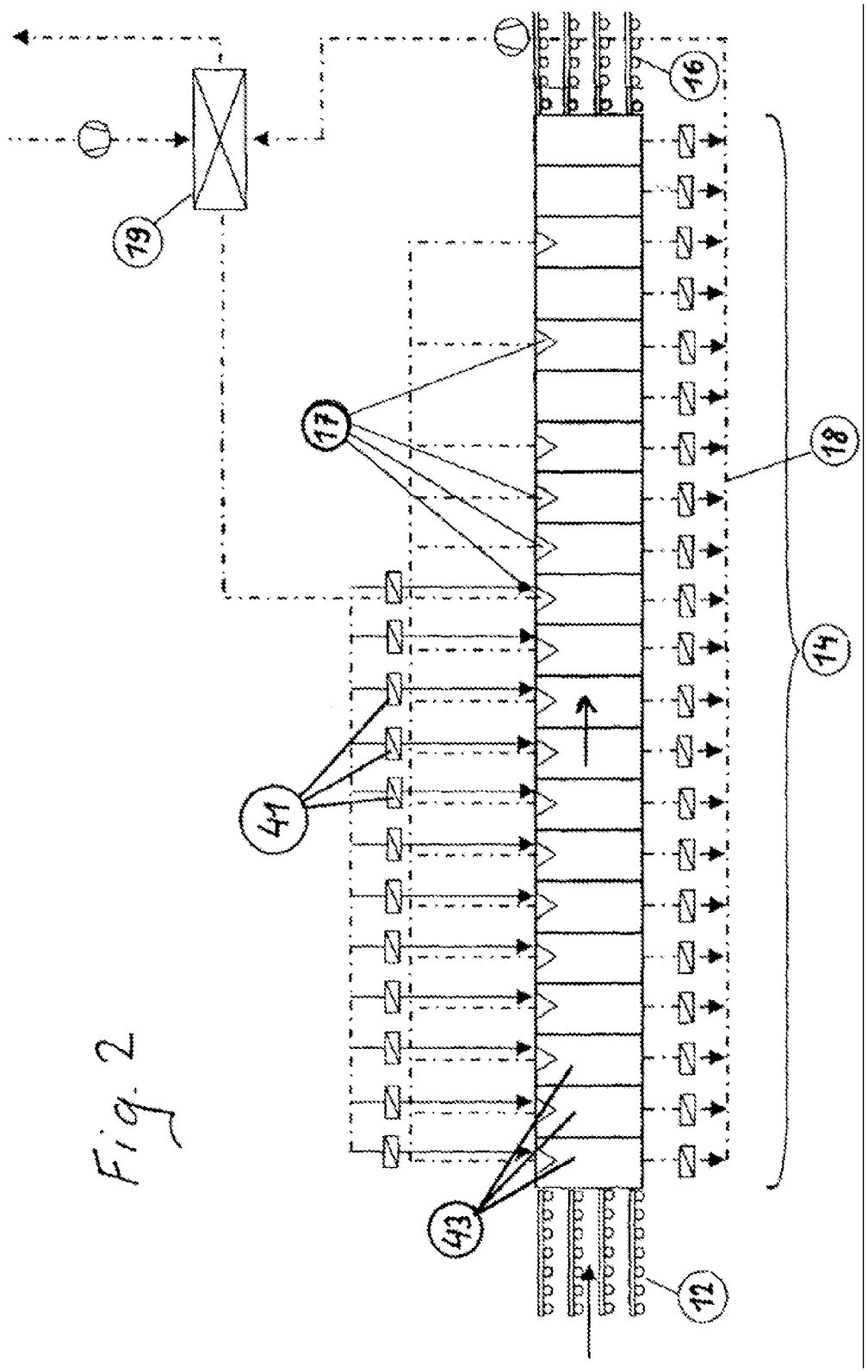
FIG. 2: shows an exemplary functional schematic diagram of a generic-type conventional drier

FIG. 2 shows by way of example a functional schematic diagram of a generic-type conventional drier.

To be seen on the right-hand side of FIG. 2 is a loading device 12 on which the material to be dried, for example a series of sandwich-type drywall sheets, passing through the drier, is delivered. The material to be dried then passes through a series of drier chambers 43 of the drying section 14 in order to finally leave the drier via an extraction device 16.

Triangles identify the heating devices 17 of the individual chambers.

The exhaust air of the individual chambers 43 is collected in a collecting line 18. Since the exhaust air is also extracted from chambers in which drying is carried out at very high temperatures, e.g. 220-300° C., the collected exhaust air is still very hot, e.g. 150-250° C.

Also, when the exhaust air is used in a heat exchanger 19 for process air heating, as shown, then in this case the so-called sensible heat is primarily transmitted.

The evaporation heat which is latent in the water vapor is therefore hardly utilized or not utilized at all. Low energy consumption within the meaning of the invention cannot be achieved.

Figure 3:
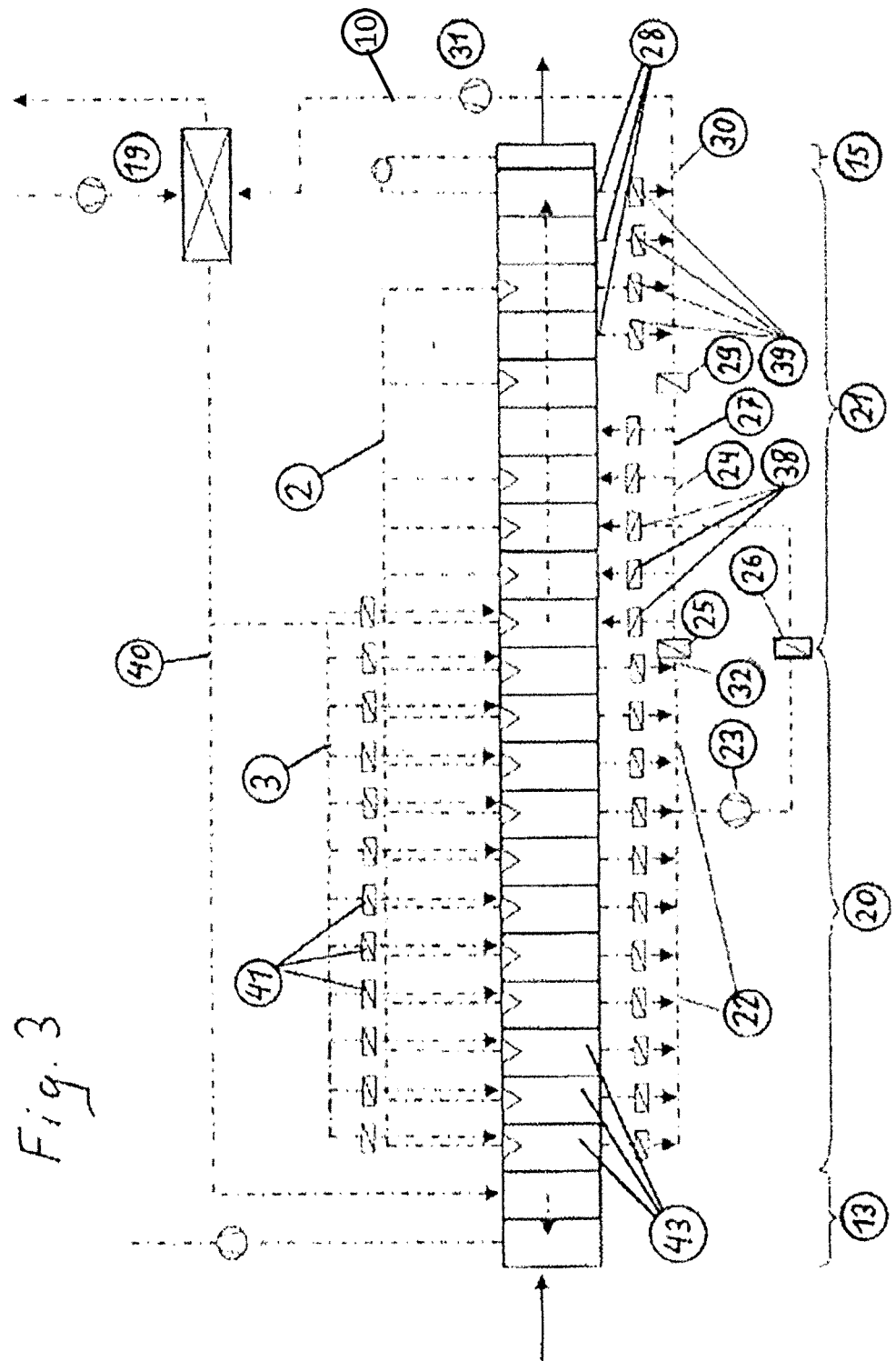
FIG. 3: shows a functional schematic diagram of the drier according to the invention

FIG. 3 shows a functional schematic diagram of the drier according to the invention.

The loading devices 12 and extraction device 16 are not shown here for reasons of clarity. In the pre-zone section 13, the sheets are preheated by means of fresh air, which is heated in the heat exchanger 19, via the fresh air line 40. This reduces the energy consumption.

The sheets then cross the main drying stage 20, wherein the circulating air has temperatures of 150° C.-350° C. before contact with the sheets and 120° C.-300° C. after contact with the sheets. The humidity of the circulating air in this stage is between 150 g/kg and 850 g/kg, depending upon the chamber.

The final drying takes place in the final drying stage 21. The sealing section 15 advantageously reduces the unwanted discharge of drying air via the drier outlet.

The heating devices 17 of the individual drying chambers 43 are shown by the arrows which project into the individual chambers 43. It can be seen that not all the chambers of the final drying stage 21 have a heating device 17. It is provided that these are not used at all, or used with the lowest possible output, for controlling during the operation according to the invention. The lines for mixing air 3 and combustion air 2 are also shown.

According to the invention, as little as possible mixing air 3 is to be used, ideally with the mixing air flaps 41 closed.

The object of splitting the drying section into a main drying stage 20 and a final drying stage 21 is the intention to collect the exhaust air of the individual chambers 43 of the main drying stage 20 and introduce it into the final drying stage 21 at the point at which the high temperature of the collected exhaust air −150° C. to 250° C. being foreseen with a humidity of 200 to 800 g/kg—is practical and acceptable, to utilize the energy of the hot air as a result of a clever air guiding for the drying in the final drying stage 21 and finally to remove the air at a significantly lower temperature −80° C. to 130° C. being foreseen with a humidity of 250 to 850 g/kg, at the point where such a low temperature is required anyway.

Depending upon the material to be dried, between 10 and 30% of the drying capacity is generated in the final drying stage 21.

Therefore, large amounts of materials to be dried, especially drywall sheets, have to be dried towards the end of the drying at low temperatures in order to prevent overdrying, which leads to damage of the material to be dried.

FIG. 3 shows how the exhaust air of the main drying stage 20 is collected in the collecting line 22 in order to then be directed by a fan 23 into the distribution line 24 to the final drying stage 21. In this case, the bypass control flap 25 is closed and the control flap A 26 is open. The air is directed into the final drying stage 21 via a plurality of feed lines 27. In this case, the flaps 38 of the feed lines are controlled so that most of the air is introduced into the first chambers of the final drying zone 21. To this end, the feed line flaps 38, which are arranged on the left in the figure, are opened as wide as possible, and the right-hand discharge control flaps 39 are throttled as far as possible. It is provided that one, or a plurality, of the chambers in the front section of the final drying stage 21 is or are equipped with such feed lines 27. The air is then discharged from the rear section of the final drying stage 21 via one of the exhaust air lines, or via a plurality of the exhaust air lines 28. The control flap 29 between the distribution line 24 and the collecting line 30 is closed or throttled during the operation according to the invention.

In this case, the flaps 39 of the exhaust lines 28 are set so that the largest proportion of the exhaust air is discharged into the last chambers 43 of the final drying stage 21. To this end, the exhaust air flaps 39, which are arranged on the right in the figure, are opened wide and the left-hand feed air flaps 38 are throttled. It is provided that one, or a plurality, of the chambers 43 of the final drying stage 21 are equipped with such discharge lines 28. Via a collecting line 30, an exhaust air fan 31 transports the air, via a heat exchanger 19 for fresh air preheating, to the outside. On account of the low exhaust air inlet temperature into the exchanger, the energy for fresh air heating now originates to a significant extent from the condensation heat of the exhaust air.

The bypass line 32 is used if air has to be discharged directly into the exchanger. To this end, the bypass control flap 25 is opened, the control flap A 26 is closed, and the control flap B 29 is opened. The fan 23 is switched off. This, for example, is the case during exceptional operating states (starting and shutting down of the plant, product changes). The drier can thus be controlled more advantageously for these states.

Figure 4:
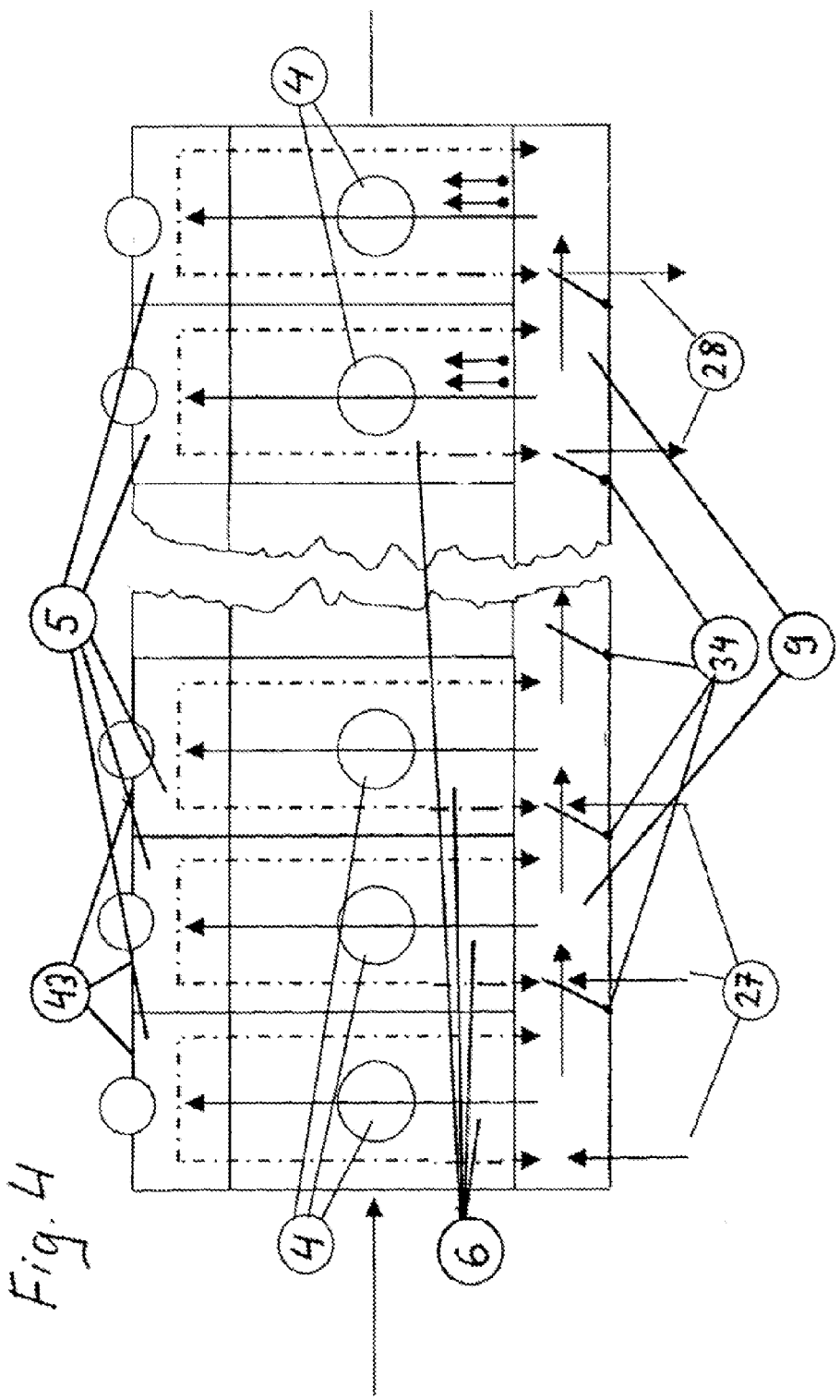
FIG. 4: shows a basic schematic diagram in plan view for air guiding in the drier according to the invention

FIG. 4 shows a basic schematic diagram for air guiding inside the drier according to the invention.

From the air feed line 27, the air finds its way into the suction chamber 9 and is mixed there with the circulating air which is present there. The surplus portion of the air, which in quantity basically corresponds to the sum of supplied exhaust air and the evaporated water, is drawn from the suction chamber of the drying chamber 43 located adjacently in the transporting direction. The sidewalls of the suction chamber, and also the sidewalls of the region of the overhead 11 up to the circulating air fan 4, towards the adjacent drying chambers 43 in each case, are set via the wall flaps 34 so as to enable passage of this air which is as efficient as possible. The circulating air is directed via the circulating air fan 4 into the pressure chamber 5 and from there is distributed to the individual nozzle boxes. The sidewalls of the pressure chamber 5 are closed.

In the actual drying chamber 6, the lateral boundary surfaces of the chambers are sealed so that basically only the sheets can pass through. According to the invention, the openings—not shown here for reasons of clarity—are of an adjustable or controllable design, depending upon the thickness of the passing sheets of the material to be dried, plus tolerance. This is necessary in order to achieve uniform drying across the width of the sheets. The air which is cooled as a result of the drying and the water vapor flow past the sheet again into the suction chamber 9. The circulating air circuit is completed there. This procedure is repeated in the subsequent drying chambers with the difference that here the drying air of the preceding chambers is also added.

The discharge line 28 functions correspondingly. Air is extracted here from the suction chamber 9, and an additional portion of the drying air is drawn into the subsequent chamber 43. In the last chamber 43, the drying air is discharged.

Figure 5:
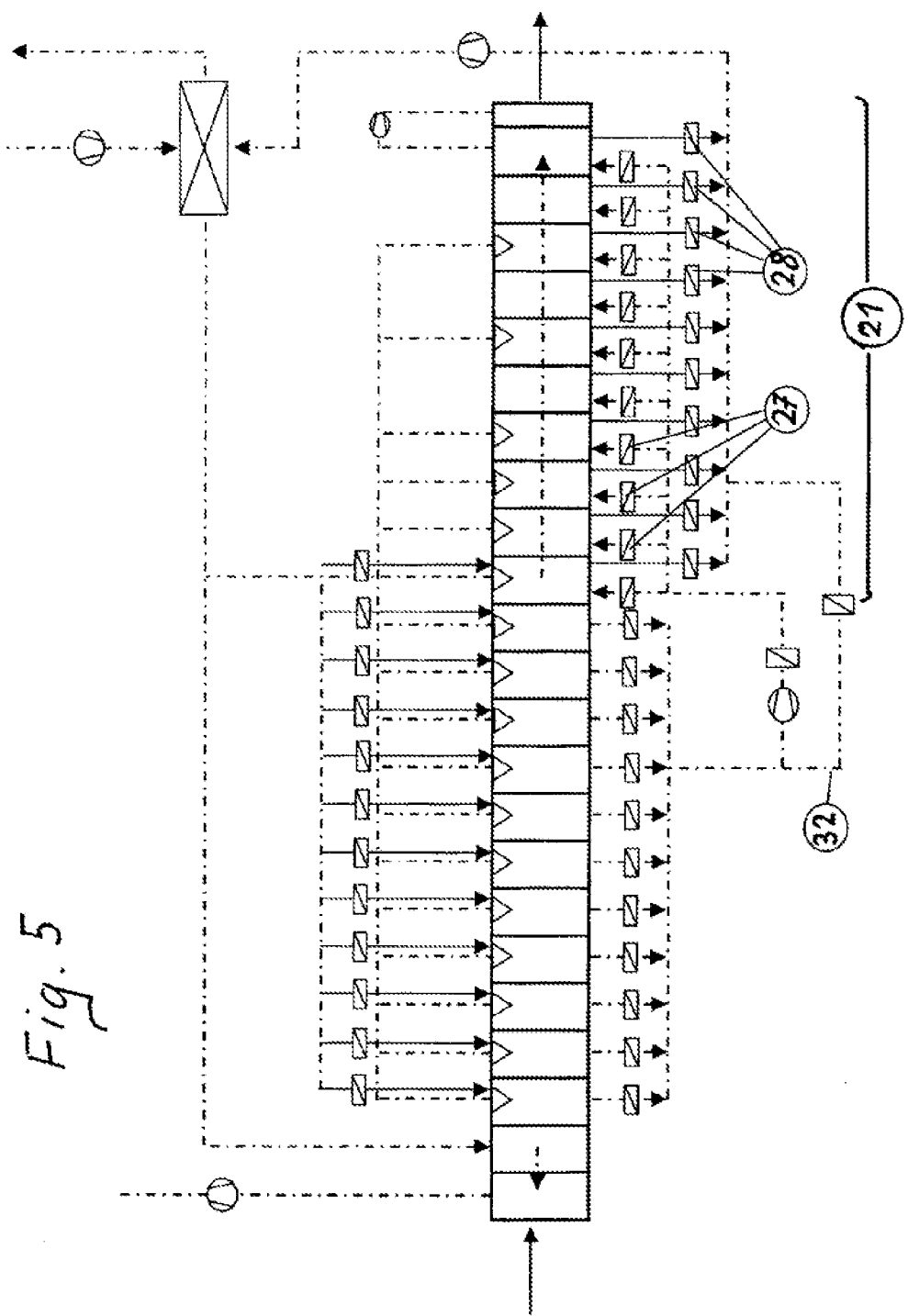
FIG. 5: shows by way of example a functional schematic diagram of an advantageous variation of the drier according to the invention

FIG. 5 shows by way of example an advantageous variation of the drier according to the invention.

In this case, each chamber 43 has a separate exhaust air feed line 27 and exhaust air discharge line 28.

This arrangement is advantageous if the supplied quantity of exhaust air is of such magnitude that during entry into the chambers 43 of the final drying stage 21, and also during passage from chamber to chamber, excessively large pressure losses would occur, or if the temperature profile, for drying-engineering reasons, has to be shifted so that in the first half of the chambers 43 of the final drying stage drying is to be carried out at slightly lower temperatures, but in the second half of the chambers 43 drying is to be carried out at slightly higher temperatures, as is the case in FIG. 3. According to the invention, the drier is set so that 60-100% is introduced in the first half of the final drying stage 21 and 60-100% is discharged in the second half of the final drying stage 21.

Also, this variation includes a bypass line 32, with which surplus exhaust air can be discharged directly to the heat exchanger 19. This is the case during exceptional operating states—see FIG. 3.

Figure 6:
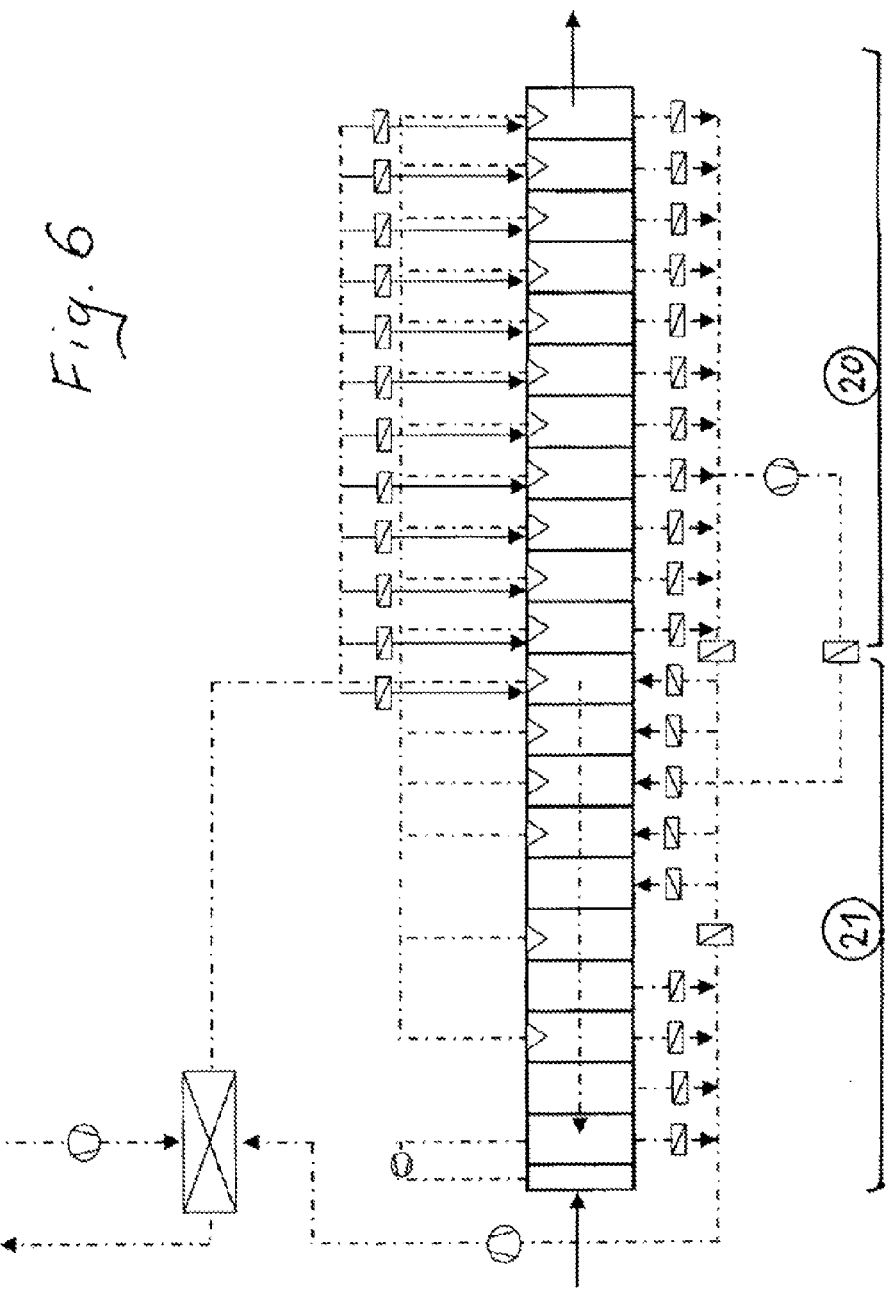
FIG. 6: shows by way of example a functional schematic diagram of a further advantageous variation of the drier according to the invention

FIG. 6 shows by way of example a further advantageous variation of the drier according to the invention.

In the case of large numbers of materials to be dried, such as ceiling tiles, it is possible and sensible to dry these towards the end of the drying at high temperatures, e.g. 150-250° C. This is the case, for example, if the material is not damaged as a result of the high temperatures and if the material has a low thermal conductance.

The air can then either not be discharged in the rear section at low temperatures, or no exhaust air can be utilized for final drying accordingly.

As the figure shows, by mirroring the arrangement of the final drying stage 21 and the main drying stage 20 success is achieved in modifying the drier so that the exhaust air from the now downstream main drying stage 20 in the now upstream final drying stage 21 of the drier can be used for heating the material and for pre-drying. There is no longer any point in the pre-zone 13 for after-drying and it is dispensed with.

The passage of exhaust air from chamber 43 to chamber 43 is carried out in the suction chamber 9 against the transporting direction.

Figure 7:
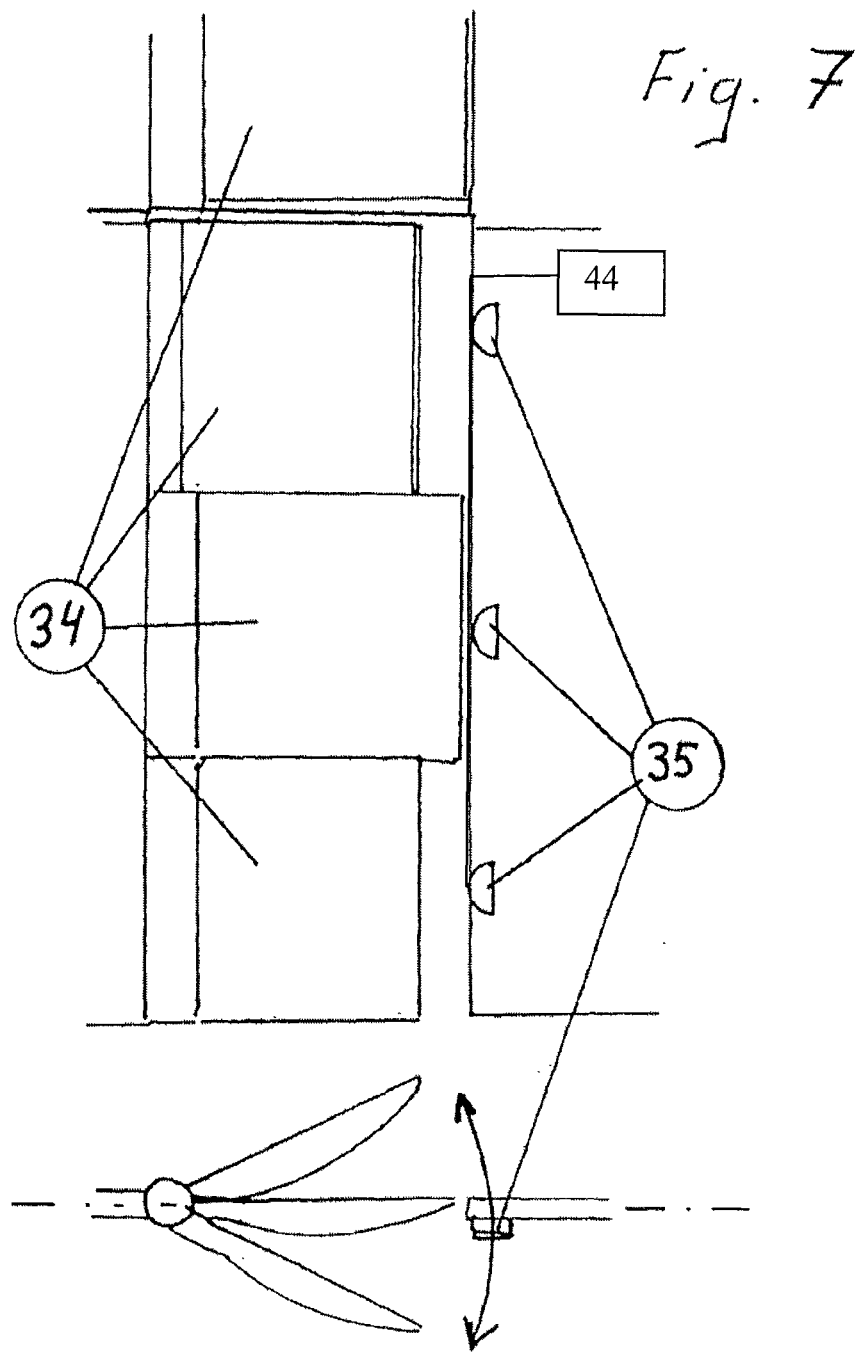
FIG. 7: shows a detailed view of the wall flaps

FIG. 7 shows a detailed view of the wall flaps. In the description of FIG. 1, reference was made to the fact that the flow conditions in the final drying stage 21 are adjusted almost at will and can be adapted in real time to the changing operating parameters. A further possibility of purposefully influencing these flow conditions exists in a particular design of the wall flaps 34. In this way, by altering the profile or the cross section, in the manner of a wing profile, of a wall flap, or of a plurality of wall flaps 34, a direct influence upon the flow velocity of the air sweeping past can be achieved. The pressure conditions on the underside or on the upper side of a wing in aircraft construction constitute an aerodynamic correlation. By means of corresponding flow sensors 35, further control parameters, such as the velocity of the flowing air, can therefore be immediately recorded and fed to a control program.

The complex control of the described movement sequences requires a special control program, for example, a computer program with a program code for implementing the method steps described herein, wherein the program is run in a computer 44, or a machine-readable carrier with the program code of a computer program for implementing the method described herein, wherein the program is run in a computer 44.

LIST OF DESIGNATIONS

1 Burner
2 Combustion air line
3 Mixing air line
4 Circulating air fan
5 Pressure chamber
6 Drying chamber
7 Nozzle boxes
8 Sheets
9 Suction chamber
10 Exhaust air discharge line
11 Overhead
12 Loading device
13 Pre-zone section
14 Drying section
15 Sealing section
16 Extraction device
17 Heating devices
18 Exhaust air collecting line
19 Heat exchanger
20 Main drying stage A
21 Final drying stage B
22 Collecting line A
23 Fan
24 Distribution line
25 Bypass control flap
26 Control flap A
27 Feed air line
28 Exhaust air line
29 Control flap B
30 Collecting line B
31 Exhaust air fan
32 Bypass line
33 Transporting device
34 Wall flaps
35 Flow sensors
36 Orifice nozzles
37 Wall-flap control unit
38 Feed air control flaps
39 Exhaust air control flaps
40 Fresh air line
41 Mixing air control flaps
43 Drying chamber
44 Computer

The invention claimed is:

1. A device for drying sheets, comprising:
a main drying stage (20) and a final drying stage (21);
a transporting device for feeding sheets, arranged in tiers, through the device, wherein each drying chamber has nozzle boxes for impinging air contained therein onto the feeding sheets, wherein the nozzle boxes are arranged in tiers transversely to the transporting direction; and
circulating air passages, arranged in the chambers (43), with heating devices for the circulating air, feed mechanisms for directing air to and from the heating devices, and also lines for feeding feed air and discharging exhaust air;
wherein
a collecting line A (22) is arranged between the main drying stage (20) and the final drying stage (21) and directs exhaust air from the main drying stage (20) into at least one nozzle box of the final drying stage (21);
a plurality of drying chambers (43), wherein
the main drying stage comprises at least two main stage drying chambers (43) the final drying stage comprises: at least two final drying chambers (43), wherein at least one, but at most half of the at least two final stage drying chambers (43), is or are equipped with controllable feed air flaps (38) with which the exhaust air from the main drying stage (20) is apportioned to or among the drying chambers of the final drying stage, and
at most a second half at least one, but of the at least two final stage drying chambers, is or are equipped with controllable exhaust air flaps (39) with which the exhaust air from the final drying stage (21) can be extracted from the drying chambers of the final drying stage;
in the final drying stage (21), wall flaps (34) in a suction chamber of at least one of the final drying stage drying chambers (43) are open to a suction chamber of an adjacent final drying stage drying chamber (43); and
a distribution line (24) is arranged between the collecting line A (22) and feed air flaps (38), and a collecting line B (30) is arranged between exhaust air flaps (39) and an exhaust air discharge line (10),
wherein the collecting line A (22) is connected to the distribution line (24) by a bypass line (32) and a control flap A (25), and the distribution line and the collecting line B (30) are interconnected by a control flap B (29).

2. The device as claimed in claim 1, further comprising a pre-zone section (13) which is arranged upstream of the main drying stage (20) and the final drying stage (21).

3. The device as claimed in claim 1, wherein the final drying stage (21) is arranged upstream of the main drying stage (20) in the transporting direction.

4. The device as claimed in claim 1, wherein the transporting device (33) comprises screen belts.

5. The device as claimed in claim 1, wherein suction chamber openings between adjacent drying chambers are formed as adjustable flaps.

6. The device as claimed in claim 1, wherein each drying chamber has three differently-sized wall flaps which are arranged in the longitudinal direction and/or in transverse direction of the drying chambers.

7. The device as claimed in claim 6, wherein each wall flap has a wall-flap control unit, and at least one wall flap has an aerodynamically formed surface and an associated flow sensor.

\* \* \* \* \*